Sept. 24, 1940.   C. E. KENNEY   2,216,013
TORQUE BALANCING MECHANISM
Filed Aug. 31, 1938
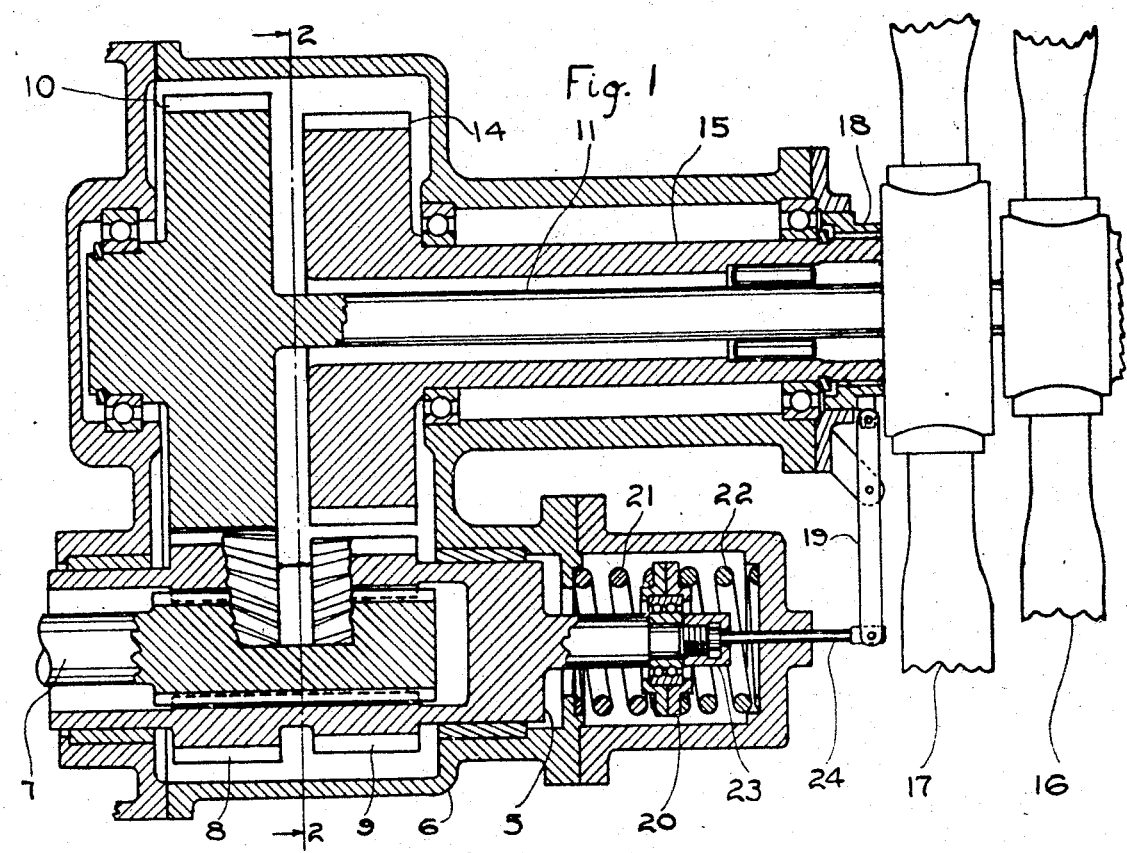
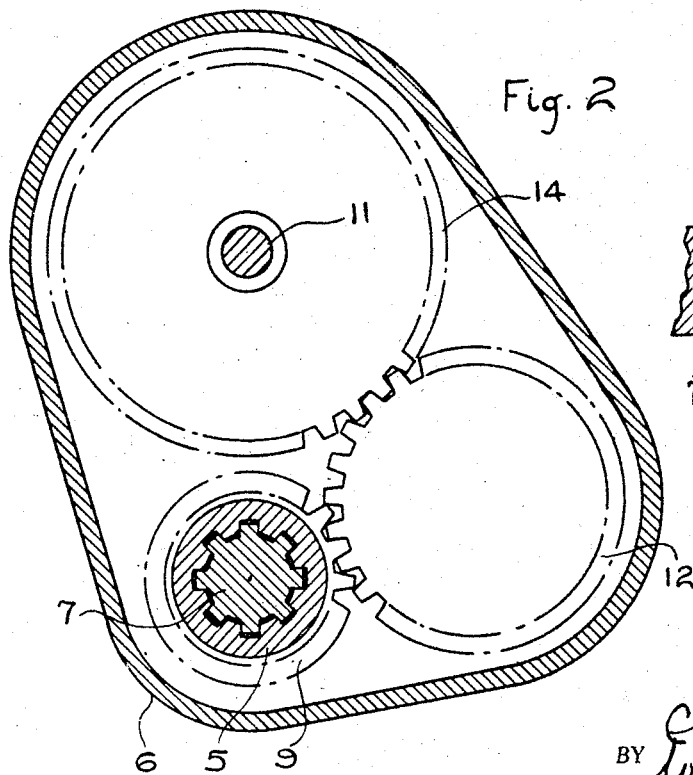
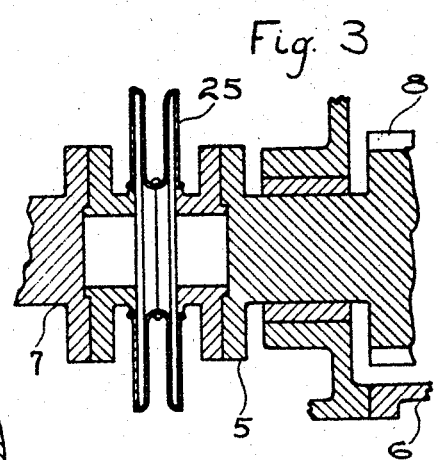
INVENTOR.
Clarence E. Kenney
BY Wheeler, Wheeler & Wheeler
ATTORNEY.

Patented Sept. 24, 1940

2,216,013

UNITED STATES PATENT OFFICE 2,216,013

TORQUE BALANCING MECHANISM

Clarence E. Kenney, Sussex, Wis.

Application August 31, 1938, Serial No. 227,680

12 Claims. (Cl. 170—135.6)

This invention relates to a torque balancing mechanism.

It is the primary object of the invention to provide simple, inexpensive and automatically operable means for balancing the load on a pair of driven shafts.

While the invention is shown in a drive to co-axial propeller shafts, it will be obvious to those skilled in the art that this is merely an exemplification of the invention and that the driven shafts need not be co-axial, nor need the loads thereon be so balanced as to be identical, it being possible to maintain any desired ratio of load as between the driven shafts.

Other objects of the invention will be more clearly apparent from the following disclosure.

In the drawing:

Fig. 1 is a view in axial section through a torque balancing drive mechanism embodying the invention.

Fig. 2 is a view taken in section on the line 2—2 of Fig. 1.

Fig. 3 is a detail view in section showing a modified driving arrangement which may be substituted for that shown in Fig. 1.

Like parts are identified by the same reference characters throughout the several views.

The driving rotor 5 is so mounted on bearings provided by the casing 6 as to be movable axially as well as rotatably. It is illustrated in its central position of axial adjustment. It is splined to the driving shaft 7 to receive rotative motion therefrom in all positions of axial adjustment.

On its periphery the driving rotor 5 carries two pinions 8 and 9 of slightly differing diameters. One or both of these pinions have helical teeth, the pitch of which is varied according to the desired effect, as will hereinafter be explained.

Pinion 8 meshes directly with the driven gear 10 on the driven shaft 11. Pinion 9 meshes with an intermediate gear 12 which, in turn, meshes with the driven gear 14 on the driven shaft 15. Each shaft is provided with appropriate bearings which may be of the type illustrated in the drawing. Obviously the gears 10, 12 and 14 will be provided with teeth complementary to the teeth of the pinions 8 and 9 from which respectively they receive their motion.

For the purposes of the present invention the shafts 11 and 15 are disclosed as delivering their power to a pair of propellers arranged to rotate co-axially in opposite directions to be driven from a single power shaft 7. The propeller 16 carried by the inner driven shaft 11 is of the well known type shown, for example, in Patent No. 1,952,066, wherein the blades are self-feathering, thus representing a variable load.

The propeller 17 mounted on the outer shaft 15 is of a type in which the blades may be feathered to vary the load but in which the feathering mechanism is actuated from an external source, being operated by the slip ring 18 under control of the shifting lever 19. Here, again, it will be understood that the illustration of these conventional propellers, both of which are known commercially, is merely an exemplification of one type of power absorbing mechanism in which this invention is useful. In this instance the utility of my torque balancing drive arises because the torque demands of propeller 16 are self-variable and propeller 17 provides, in the pitch adjustment of its blades, a convenient illustration of one type of mechanism in which the load may be subjected to a compensatory variation. In other applications of the invention any load varying means electrically, mechanically, pneumatically, or hydraulically operated, would be regarded as equivalent. For example, a brake might be applied to shaft 15 to vary the load thereon, or an infinite ratio speed changer might be interposed between such shaft and the work to be driven thereby without changing the principle here involved.

In actual practice the end thrust and the reaction exerted upon driving and driven helical gears respectively, is equal to the co-tangent of the helical angle of gear tooth pitch times the tooth load. In this device the end thrust developed between pinion 8 and gear 10 is exerted upon rotor 5 in a direction opposite to the end thrust developed between pinion 9 and intermediate gear 12, the pitch of the helical teeth of pinions 8 and 9 being usually opposite for this purpose. The difference in diameter between pinions 8 and 9 gives pinion 9 a slightly increased tooth load if shafts 11 and 15 are transmitting equal torque. This is compensated by slightly decreasing the co-tangent of the helical angle at which the teeth of pinion 9 are pitched. It will be obvious to those skilled in the art that by taking into consideration the difference in diameter between the pinions 8 and 9 and the torques to which shafts 11 and 15 are desirably subject, the end thrust developed on rotor 5 due to the reaction of the helical teeth of pinion 8 with the teeth of gear 10 can be made exactly equal and opposite to the end thrust developed on rotor 5 between pinion 9 and gear 12 so long as the ratio of torques remains constant.

It will be equally obvious to those skilled in the art that when there is any variation in the predetermined ratio of torque as between shafts 11 and 15, the end thrust to which rotor 5 is subjected will thereby be unbalanced to create a pressure differential in one direction or the other and rotor 5 will consequently be caused to move to the right or left, depending on whether the torque in shaft 11 is greater or less than the desired ratio to the torque in shaft 15.

This motion of rotor 5 is used to compensate for the relative load fluctuation. A spring seat member 20 swiveled to the rotor 5 receives the pressure of opposing compression springs 21 and 22, which tend to maintain the rotor centered in the position illustrated in Fig. 1. At the end of rotor 5 is a cap 23 in which is swiveled the head of a Bowden wire 24 which, for the purposes of the present invention, is coupled to the lever 19 which adjusts the load on shaft 15. As above indicated, it is immaterial to the invention how the load is adjusted. For purposes of illustration the load is adjusted by simply changing the pitch of the blade of propeller 17 to decrease the pitch when a decrease in load is indicated, and to increase the pitch when an increase in load is indicated as necessary to restore balance.

Thus, no matter to what extent, within the capacity of the apparatus, the load represented by propeller 16 on shaft 11 may fluctuate, the slightest variation in relative load as between shafts 11 and 15 will result in an axial displacement of rotor 5 which, in turn, will produce a compensatory adjustment of the load represented by propeller 17 on shaft 15 so that the predetermined ratio will be substantially restored.

Because the splined connection between the driving shaft 7 and the rotor 5 may require a substantial amount of differential axial force to overcome friction therein, I may couple driving shaft 7 to the rotor 5 by the flexible diaphragm coupling shown at 25 in Fig. 3. This, however, is merely a detail which is broadly immaterial to the invention.

It is likewise broadly immaterial to the invention whether the driving or the driven elements of the transmission are free to yield axially for the purposes of effecting the desired adjustment. In other organizations it is easily possible to make the driven gears axially movable in an organization in which their opposed thrusts are balanced. The reaction being equal to the thrust developed in the driving rotor or rotors, the same forces are present in the driven elements and may be used in accordance with the principle herein disclosed.

I wish to repeat that the desired balance of end thrust on the shiftable rotor need not be achieved at a point where the torques in the driven shafts are identical. It is only necessary that the thrust in each direction be identical when the loads bear the desired ratio and this can, if desired, be accomplished when one of the driven shafts is highly loaded and the other is lightly loaded by selecting suitable values for the helix angles of the teeth of pinions 8 and 9.

I claim:

1. In a torque balancing mechanism, the combination with a pair of driven elements and means for varying the load to which at least one of said elements is subject, of driving elements for the driven elements provided with driving connections of a type developing axial thrust, said connections being reversed in the drives between the respective elements whereby the axial thrust developed in driving one of the driven elements will be opposed to the axial thrust developed in the driving of the other, means coupling certain of said elements as a pair, means mounting the coupled pair of elements for axial movement responsive to the differential of the thrust developed as between said elements, means restricting axial movement of the coupled pair of elements within a predetermined range, a member connected to said movably mounted pair of elements and provided with motion transmitting connections to said load varying means for the adjustment thereof in a direction to compensate for relative variations in the torque between the driving and driven elements from a predetermined relative torque.

2. In a device of the character described, the combination with a pair of driving elements having helical teeth and a pair of coacting driven elements having helical teeth, the teeth of the respective driving and driven elements being pitched for opposite axial thrust reaction, of means connecting one pair of said elements for concurrent axial movement, said last mentioned means and elements being provided with bearings for accommodating both rotative and axial movement of the connected pair of elements, means yieldably opposing axial movement of said pair of elements, and a member connected with said pair of elements to be moved thereby in accordance with the axial displacement of the connected pair of elements responsive to a change in relative torque transmitted between the respective driving and driven elements.

3. In a device of the character described, the combination with a pair of driving elements provided with helical teeth and a pair of driven elements provided with helical teeth, the respective helical teeth being pitched to develop opposite axial thrust reaction equal upon the delivery of predetermined relative torque from the respective driving elements to the respective driven elements, of means providing bearings for certain of said elements subject to opposite torque in which said elements are not only rotatable but axially reciprocable responsive to the differential of said torque, said last mentioned elements being provided with coupling means connecting said elements for concurrent axial movement, spring means opposing such axial movement, means for varying the torque to which one of said driving elements is subject, and motion transmitting mechanism connecting said coupled elements to said last mentioned means for the adjustment of said last mentioned means responsive to the displacement of the coupled elements axially from the predetermined position assumed by the coupled elements when the torque is at the predetermined ratio in which the axial thrust on the coupled elements is in balance.

4. In a device of the character described, the combination with first and second driving elements and first and second driven elements, said driving and driven elements having intermeshing helical teeth pitched to develop opposite axial thrust as between the respective driving elements and the respective driven elements, means coupling together for unitary movement two of said elements subject to opposing thrust, means providing a mounting supporting the coupled elements for such axial movement responsive to thrust differentials resulting from a change in relative torque transmitted between the respective driving elements and the respective driven elements, and opposing yieldable means operatively connected to act upon the coupled elements in directions tending to center the coupled elements in a position intermediate the range of axial movement of said elements, said position substantially corresponding to the position assumed by said coupled elements when the opposing thrusts thereon are substantially equal.

5. In a device of the character described, the combination with first and second driving elements and first and second driven elements, said driving and driven elements having intermeshing helical teeth pitched to develop opposite axial thrust as between the respective driving elements and the respective driven elements, means coupling together for unitary movement two of said elements subject to opposing thrust, means providing a mounting supporting the coupled elements for such axial movement responsive to thrust differentials resulting from a change in relative torque transmitted between the respective driving elements and the respective driven elements, and opposing yieldable means operatively connected to act upon the coupled elements in directions tending to center the coupled elements in a position intermediate the range of axial movement of said elements, said position substantially corresponding to the position assumed by said coupled elements when the opposing thrusts thereon are substantially equal, means for varying the torque to which one of the coupled elements is subject, and motion transmitting mechanism connecting the coupled elements with said torque varying means for mechanically and automatically varying said torque upon the displacement of the coupled elements from the intermediate position to which such elements are urged by said yieldable means.

6. A device of the character described, comprising the combination with a single rotor provided with driving pinions having differentially pitched helical teeth, of a pair of driven elements with complementary teeth meshing with the respective pinions, the pitch of said teeth being adapted to impose opposite axial thrusts upon said rotor substantially equal in the transmission of a predetermined relative torque from said rotor to the respective driven elements, means mounting said rotor for axial and rotative movement, opposed spring means acting on said rotor in opposition to axial displacement thereof, a driving connection to said rotor adapted to accommodate said axial movement, means for varying the load on one of the driven elements with respect to the load imposed on the other, whereby to vary the relative thrust developed in the mesh of said rotor with the respective driven elements, and motion transmitting connections from said rotor to said load varying means for transmitting the axial shifting motion of the rotor to said load varying means in a direction to vary the relative load as between the driven elements compensatory for variations in torque productive of unbalanced axial thrust on said rotor.

7. In a device of the character described, the combination with a rotor unitarily provided with pinions having differentially pitched teeth, of driven gear elements having complementary teeth and meshing with the respective pinions and the differential pitch of the pinion teeth being adapted to develop opposite axial thrusts imposed on said rotor in proportion to the torque transmitted from the rotor to said driven elements, means mounting the rotor for axial and rotative movement, means yieldably fixing a predetermined rotor position of axial movement, and a member connected with said rotor to partake of the axial movement thereof in response to axial displacement of said rotor consequent upon a change in relative axial thrust occasioned by a change in relative torque transmitted to the respective driven elements.

8. In a device of the character described, the combination with a driving pinion element and a driven element having helical pitched co-acting teeth adapted to develop an axial thrust oppositely in the respective elements and substantially proportionate to the torque transmitted, bearing means in which one of said elements is axially displaceable as well as rotatable, the displaceable element being movable in both directions in said bearing means from a predetermined central position, opposed springs provided with operative connections to the displaceable element for maintaining it yieldably in said predetermined position, a member connected to the movable element to partake of the axial displacement thereof in either direction from said position, and means for varying the torque transmitted between said elements, said means being connected with said member for adjustment automatically in accordance with the displacement of said member and in a direction compensatory for the torque variation occasioning such displacement.

9. A device of the character described, comprising the combination with a pair of concentric shafts, of driven elements connected with the respective shafts, driving elements connected with the respective driven elements for the transmission of torque to said shafts, the connection between the driving and driven elements including differentially pitched helical teeth adapted to develop opposite axial thrust upon the driving elements and the driven elements, means mounting and connecting a pair of said elements subject to opposite thrust for concurrent axial movement responsive to the differential between the thrusts to which they are subject, means for restricting the axial displacement of said connected pair of elements within a given range, means for varying the torque transmitted between one of the driving elements and its respective driven element, and motion transmitting connections for delivering to said last mentioned means motion resulting from the axial displacement of the pair of elements connected for such displacement.

10. In a device of the character described, the combination with a pair of co-axial shafts and driven gear elements connected therewith, of a pair of co-axial driving pinion elements meshing with the respective gear elements for the operation of said shafts, the respective pinion elements and their co-acting gear elements being provided with differentially pitched helical teeth adapted to develop opposing axial thrust as between the driving pinion elements, said elements being mechanically connected for concurrent axial movement and being provided with bearings in which they are axially adjustable as well as rotatably movable, means for restricting the axial displacement of said connected pair of elements within a given range, means for varying the load to which one of the driven shafts is subject, and a motion transmitting connection from the connected pinion element to said load varying means for transmitting to the load varying means the axial motion developed in the pinion elements upon a change in the relative torque transmitted therethrough.

11. In a device of the character described, the combination with a rotor provided with bearings in which said rotor is axially reciprocable, of a pair of pinion elements mounted on said rotor and provided with differently pitched helical teeth, driven gear elements meshing with the pinion elements and adapted to develop in said rotor opposite axial thrusts equalized or unbalanced according to the torque transmitted from said rotor to the respective driven elements, spring means tending to center said rotor in its range of axial movement in a position from which said rotor is axially displaceable in either direction according to the differential of thrust developed, and means for varying the load on the driven elements compensatory for thrust differentials occasioning axial movement of said rotor, said last mentioned means being operatively connected with said rotor to receive movement therefrom when said rotor adjusts itself axially against the pressure of said spring means.

12. In a device of the character described, the combination with a pair of co-axial shafts, of propellers thereon, at least one of said propellers having blades adjustable as to pitch, and means for adjusting said blades whereby to vary the load to which said shaft is subject, gears mounted on the respective shafts provided with helical teeth, a rotor provided with separate pinions having helical teeth, one of said pinions meshing directly with one of said gears, a helically toothed intermediate gear intervening between the other of said pinions and the other gear, said pinions being of different sizes and the pitch of the helical teeth thereof being opposite and sufficiently different as to angle to substantially balance the axial thrust oppositely imposed on the rotor when the load of the respective propellers is substantially equal, means mounting the rotor for axial displacement responsive to an unbalance of axial thrust thereon occasioned by a variation in the predetermined relative load of said shafts, springs acting oppositely in axial directions upon said rotor in opposition to its displacement in either direction, and means for transmitting motion from the rotor upon the axial displacement thereof to the adjustable blades of said propeller for adjustment of the pitch of said blades in a direction to vary the propeller load compensatory for the difference in load which produced the displacement of the rotor.

CLARENCE E. KENNEY.